Fig. 1
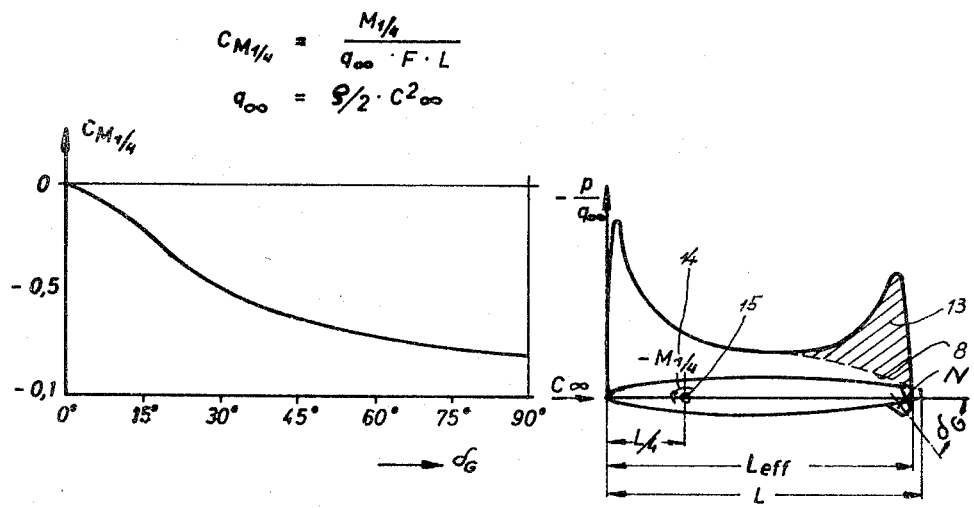
Fig. 2
Fig. 2a
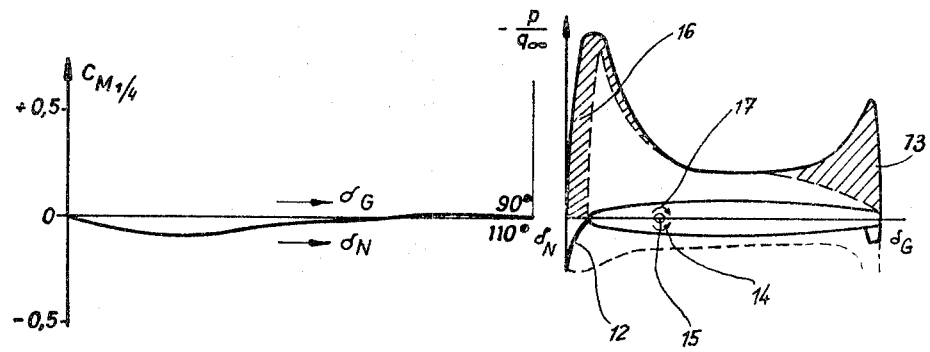

Dec. 13, 1966  N. LAING  3,291,420
WING STRUCTURE AND DUCT MEANS FOR AIRCRAFT
Filed Aug. 11, 1964  15 Sheets-Sheet 2
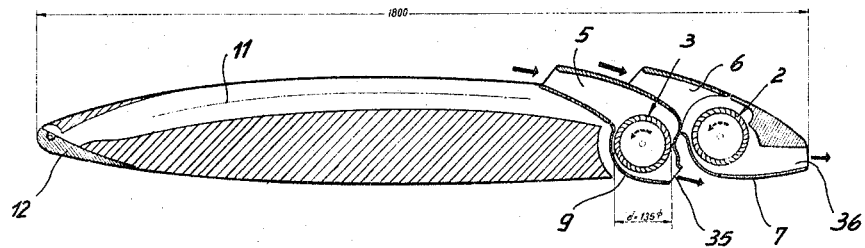
Fig. 3
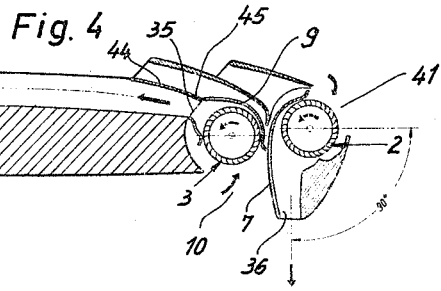
Fig. 4
Fig. 5
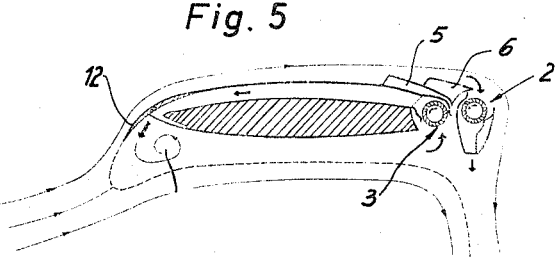
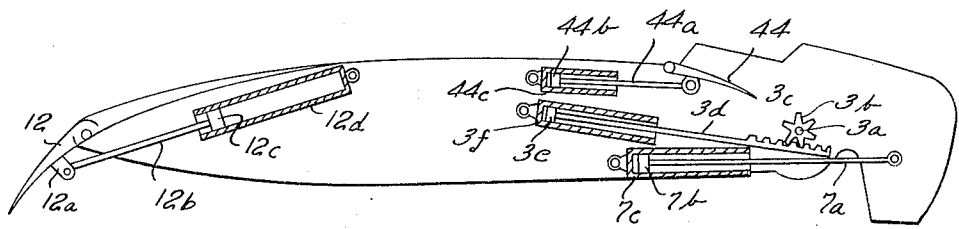
Fig. 4a
INVENTOR
BY
ATTORNEY

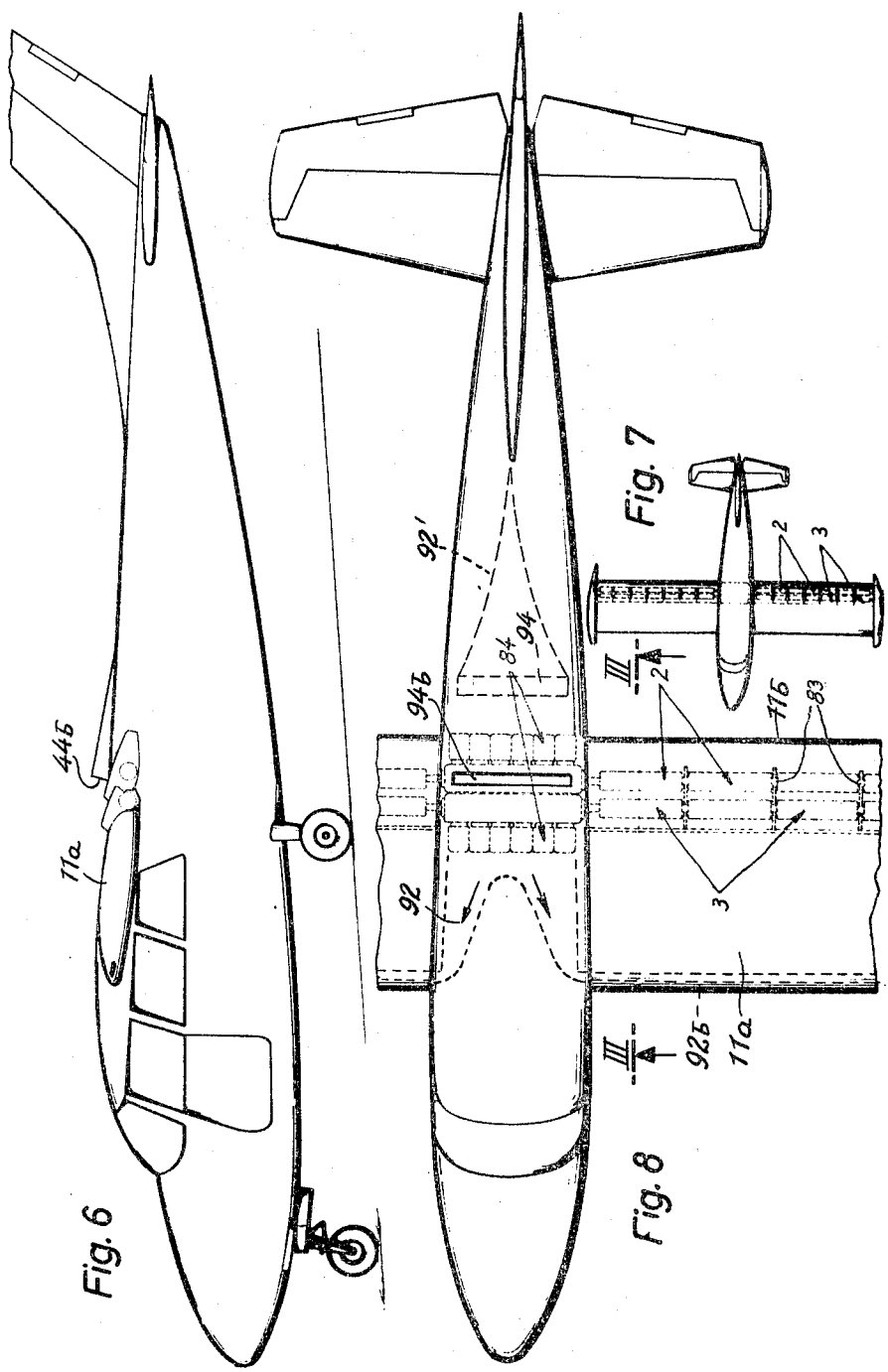

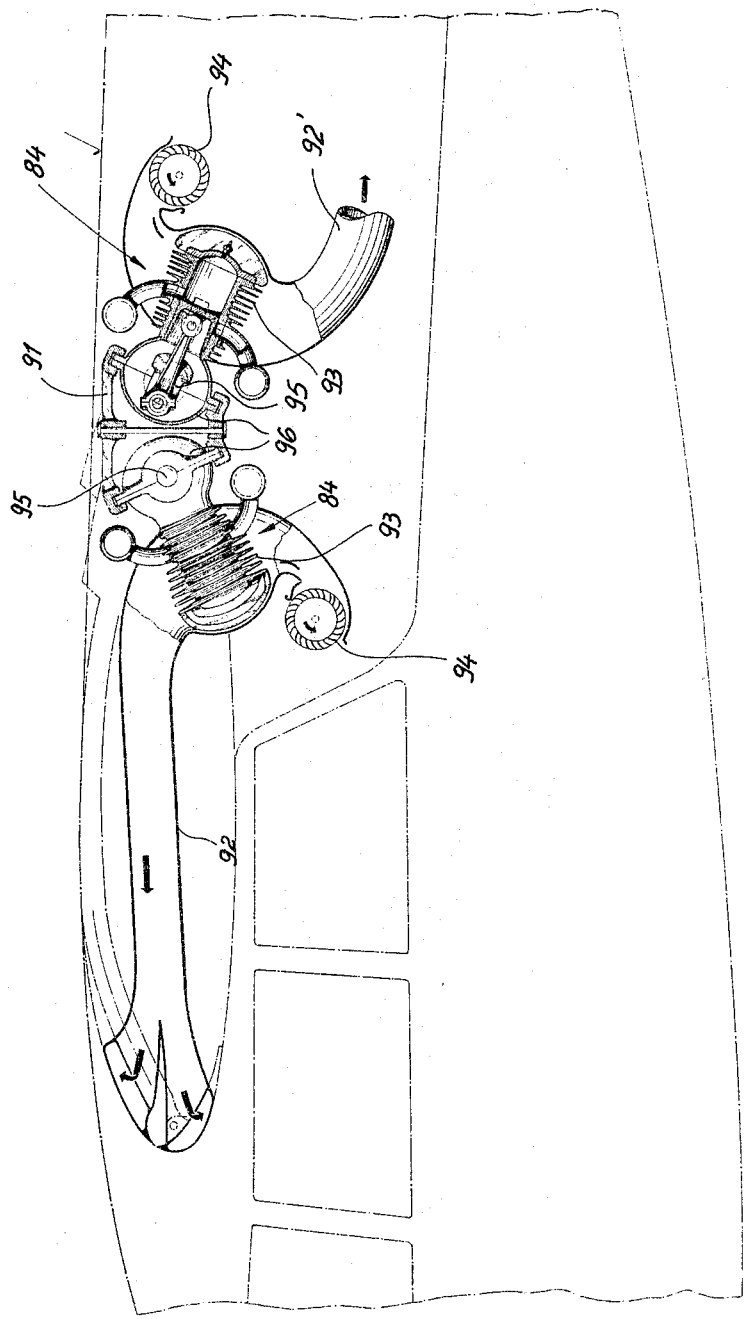

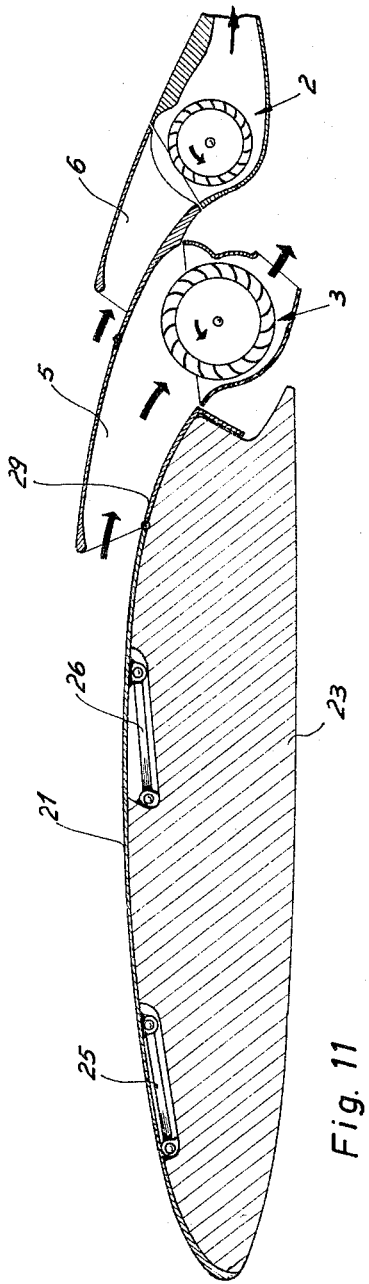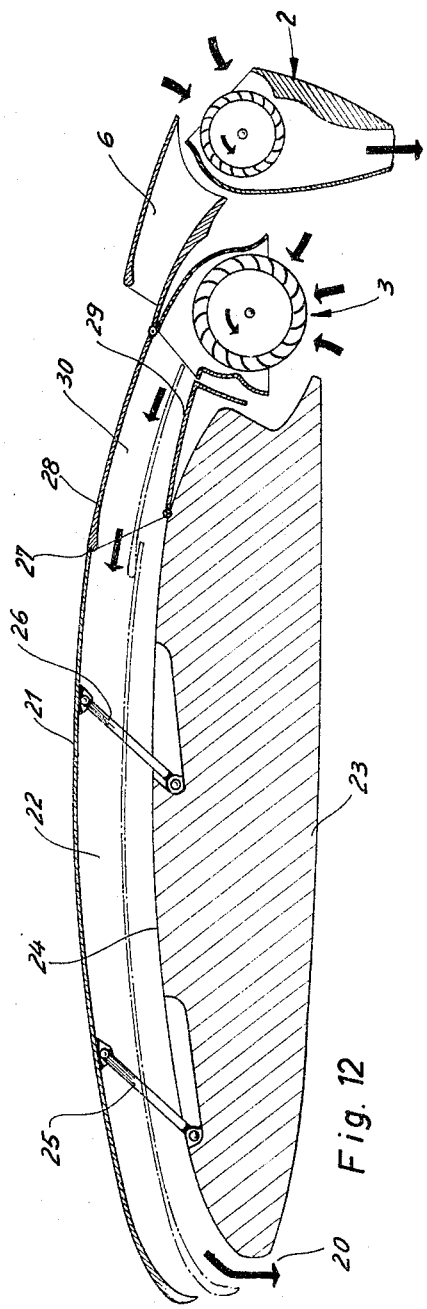

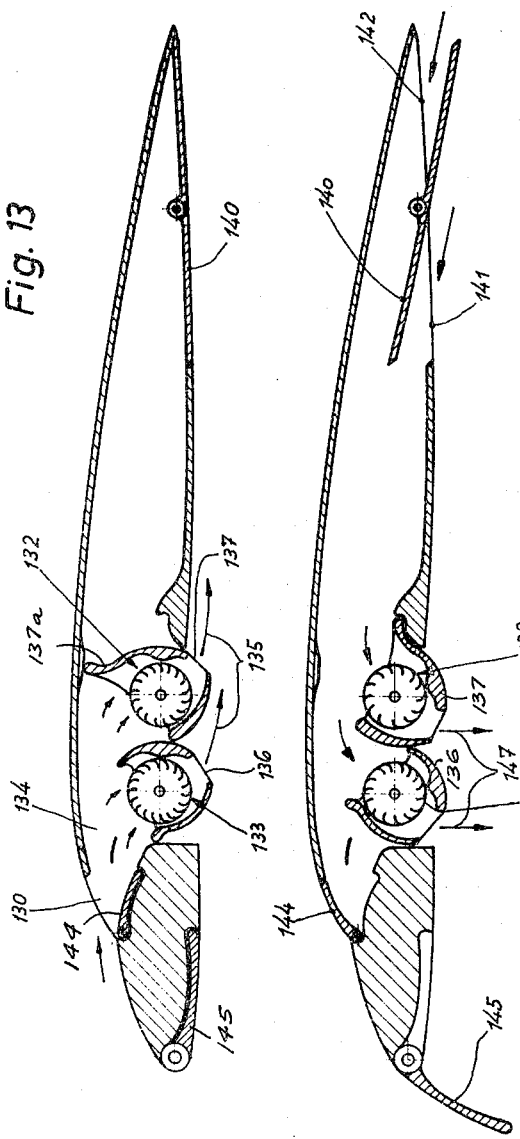

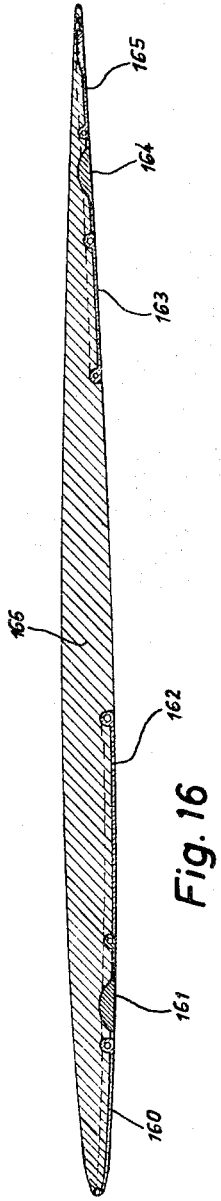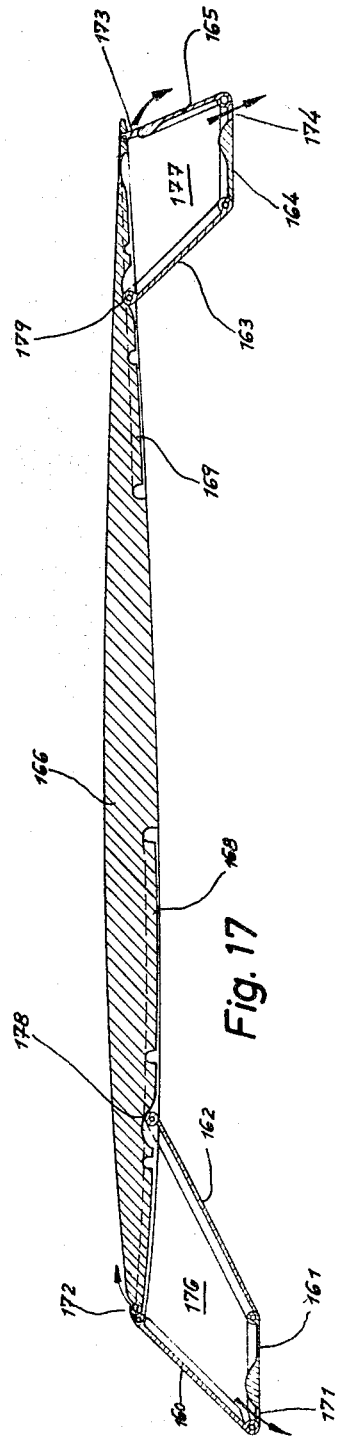

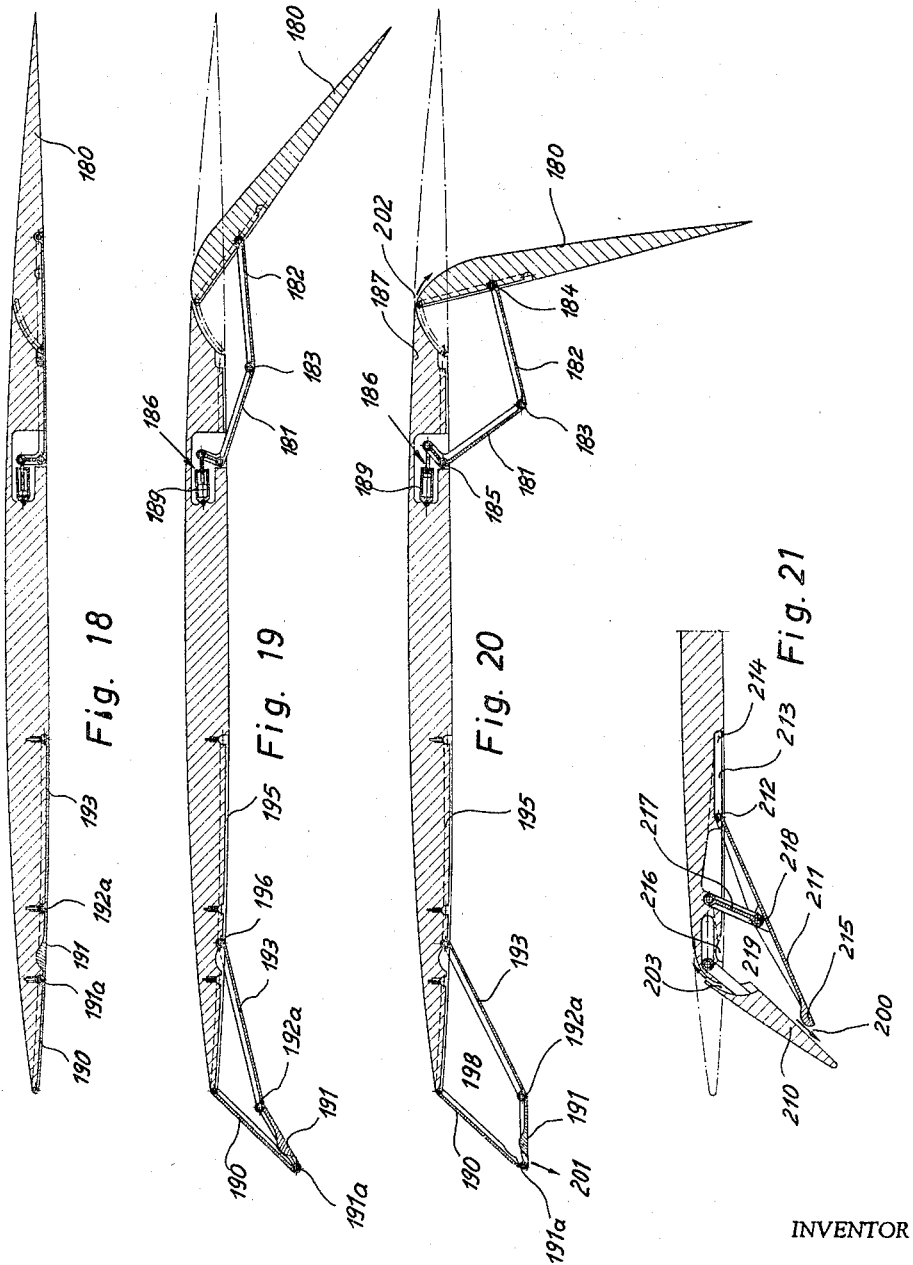

Dec. 13, 1966 N. LAING 3,291,420
WING STRUCTURE AND DUCT MEANS FOR AIRCRAFT
Filed Aug. 11, 1964 15 Sheets-Sheet 10

Dec. 13, 1966  N. LAING  3,291,420
WING STRUCTURE AND DUCT MEANS FOR AIRCRAFT
Filed Aug. 11, 1964  15 Sheets-Sheet 11
Fig. 24
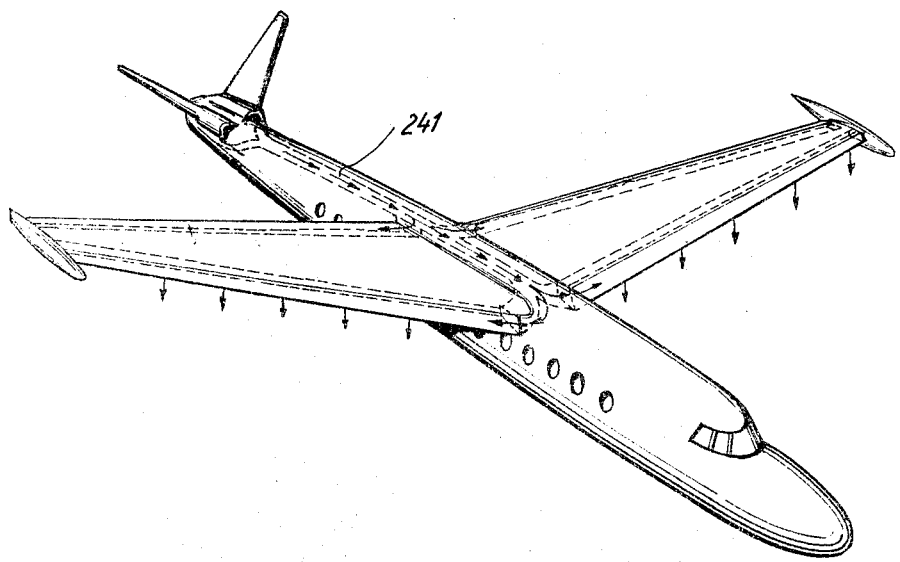
Fig. 25
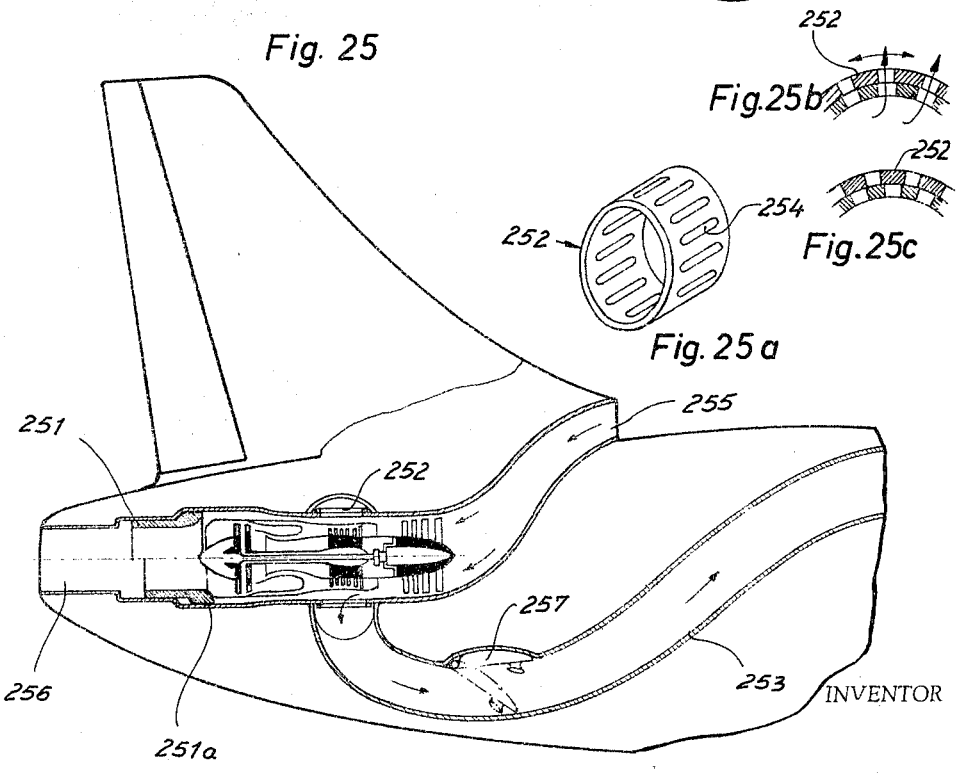
Fig. 25b
Fig. 25c
Fig. 25a
INVENTOR
BY
ATTORNEY Dec. 13, 1966   N. LAING   3,291,420
WING STRUCTURE AND DUCT MEANS FOR AIRCRAFT
Filed Aug. 11, 1964   15 Sheets-Sheet 12
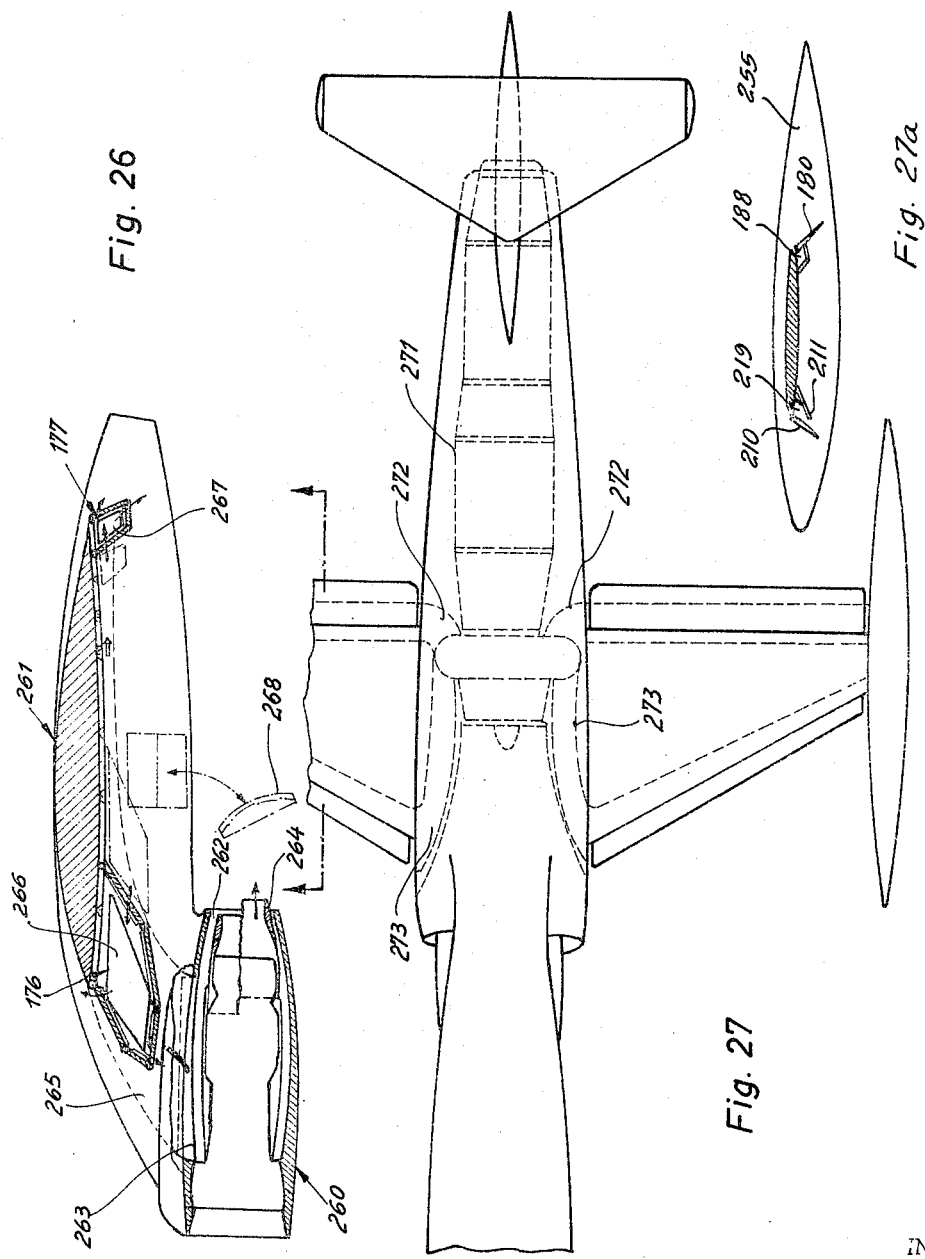
INVENTOR
BY
ATTORNEY

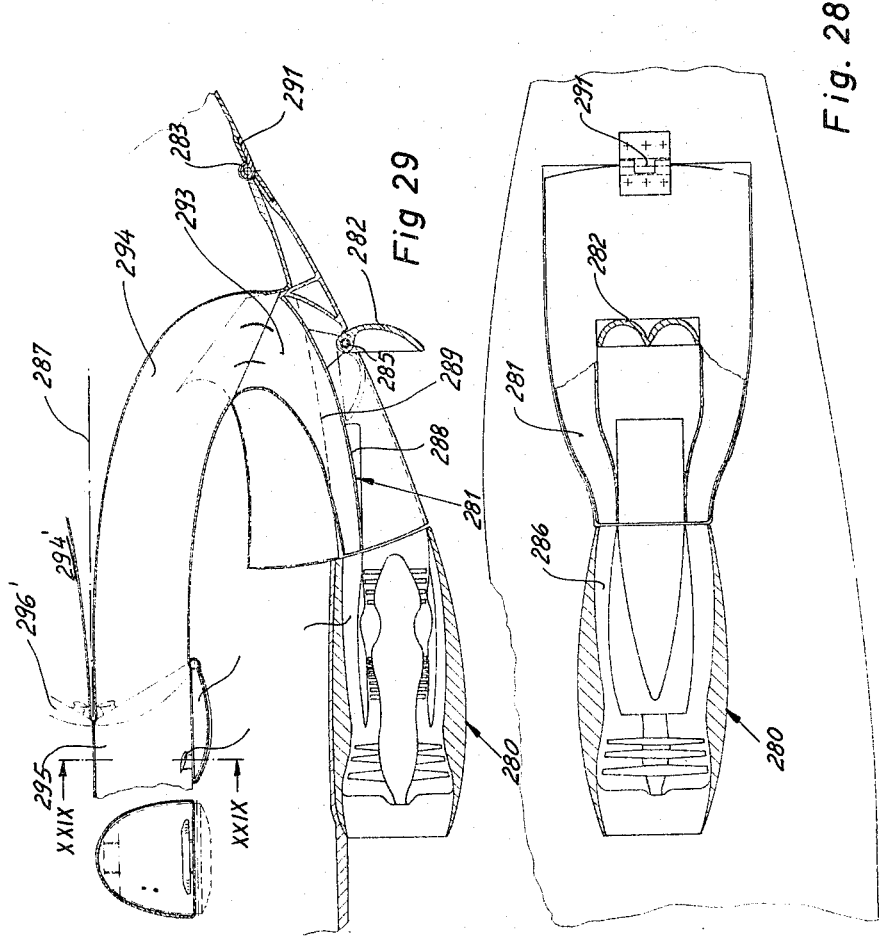

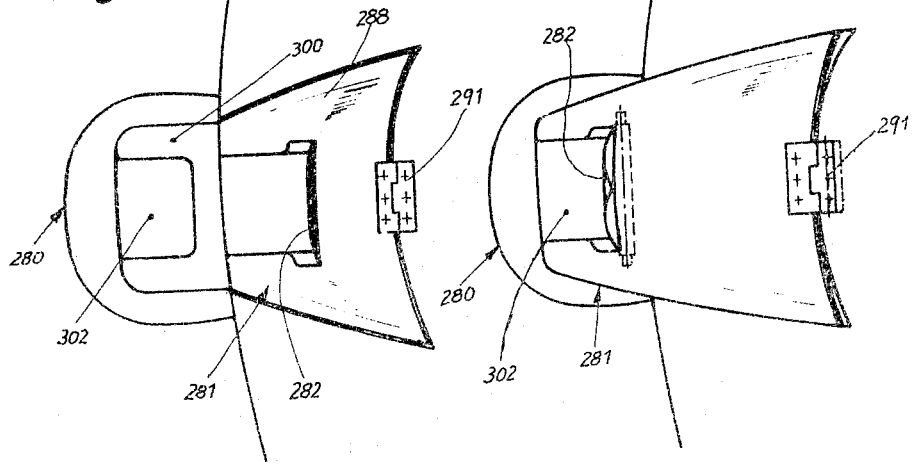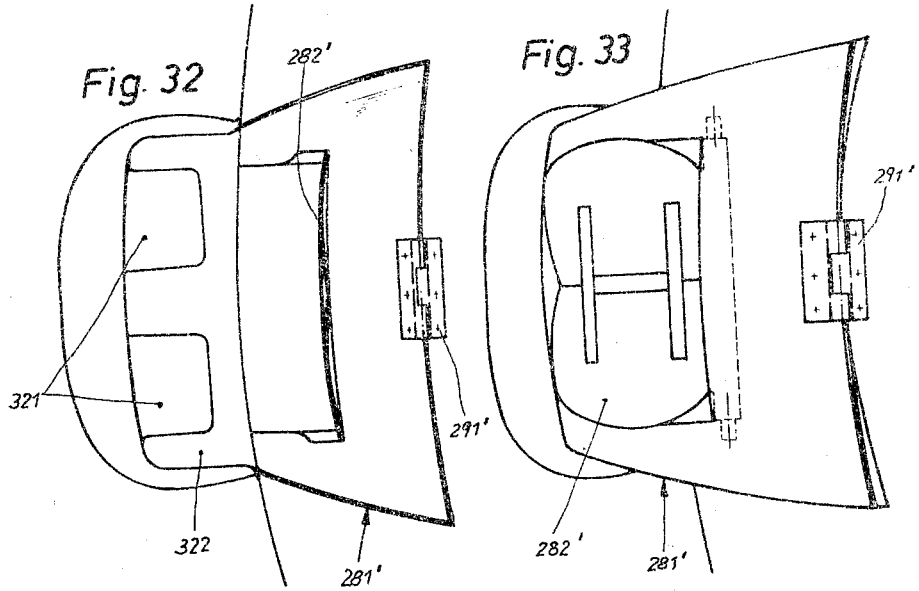

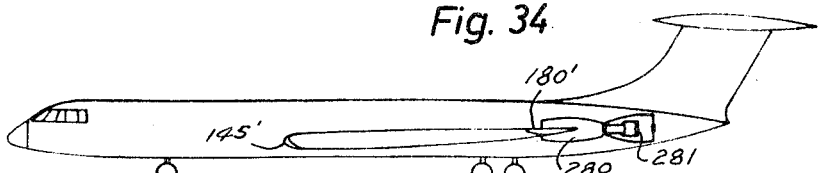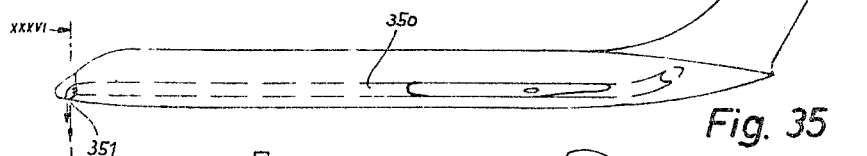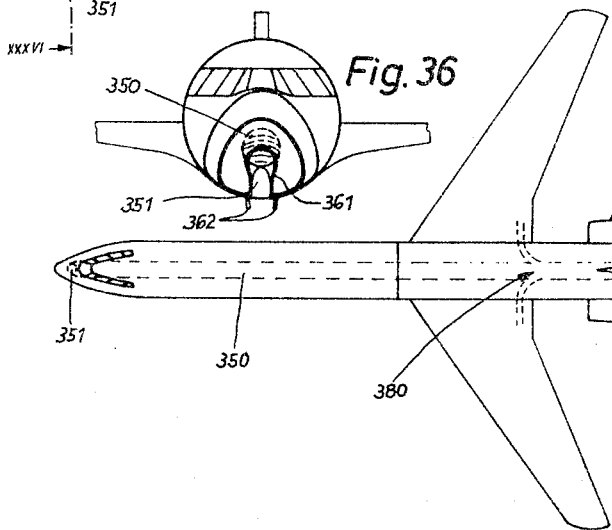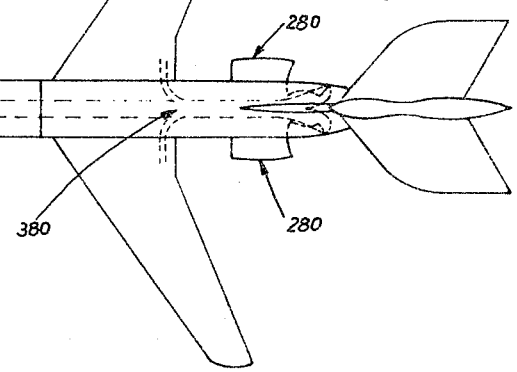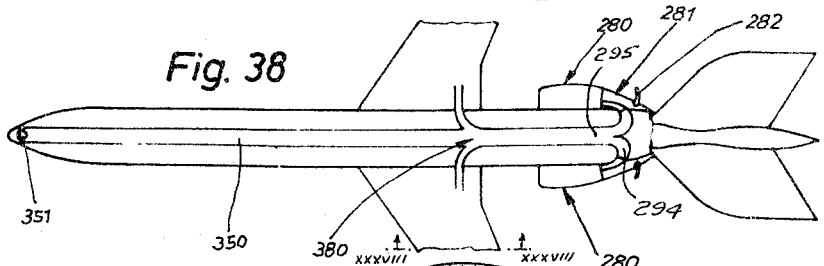

United States Patent Office 3,291,420
Patented Dec. 13, 1966

3,291,420
WING STRUCTURE AND DUCT MEANS
FOR AIRCRAFT
Nikolaus Laing, Hofener Weg 35–37, Aldingen, Germany
Filed Aug. 11, 1964, Ser. No. 388,802
Claims priority, application Germany, Aug. 12, 1963,
L 45,588; Oct. 29, 1963, L 46,191
23 Claims. (Cl. 244—42)

The present invention relates to a wing structure and duct system for an aircraft, and more particularly to an aircraft particularly suited for vertical or steep take-off and landing operations.

Conventional aircraft provided with propeller propulsion systems or with jet engines require comparatively long runways for take-off and landing. Rotor lifting screws and take-off rockets have been proposed, but these constructions are expensive and not suited for passenger airplanes.

It has been proposed to increase the lifting force acting on the aircraft by providing a stream of air in the region of the trailing edge of the wing for the purpose of producing a deflection of the air stream.

In this way, very high lifting forces have been produced during wind tunnel tests, for example lift factors of eight have been produced. This is substantially three times the lift which can be produced by very complicated flap constructions provided on the wings, and operating without the discharge of air from the wings. However, under practical conditions these high lift factors could not be achieved, since, in contrast to the normal flight position, the discharge of a stream of air from the rear edge of the wing produces a zone of great underpressure on the surface of the wing near its trailing edge, producing a moment acting to turn the aircraft about its transverse axis to a nose-down position.

It has been proposed to solve this problem by placing the wing closer to the forward end of the aircraft. In other known constructions, the wing is turned about a transverse axis to increase the lift. Such mechanical constructions are very complicated, and consequently expensive, particularly since the movable wings must resist very great forces.

It is one object of the invention to overcome the disadvantages of known constructions in which air is discharged from the wing of an aircraft, and to provide a wing structure and duct system in which the nose-down moment is compensated by a nose-up moment about the transverse axis of the aircraft.

Another object of the invention is to provide an aircraft which can be operated at very high speed, as well as at low speed.

Another object of the invention is to provide an aircraft which can be operated economically at very high cruising speeds, but which is also capable of vertical, or at least very steep, take-off and landing operations.

Another object of the invention is to compensate the nose-down movement produced by a discharge of air from the wing of the aircraft by a nose-up moment produced by the discharge of air in downward direction from a part of the aircraft located forwardly of its transverse axis, for example from the leading edge of the wing of the aircraft.

Another object of the invention is to provide in an aircraft ducts for supplying a hot gaseous medium to the leading edges of the wing and to the control foils of the aircraft to de-ice the same.

With these objects in view, the present invention relates to an aircraft which comprises a wing structure. In accordance with one embodiment of the invention, the wing structure includes duct means opening in the region of the leading edge of the wing structure, and a stream of the gaseous medium, such as air, is produced in the duct means; and means in the region of the leading edge of the wing structure cause a downwardly directed outflow from the duct means whereby a nose-up moment is produced. In the preferred embodiment of the invention, air is also discharged from the rear edge of the wing structure whereby a nose-down moment is produced, and the air streams and the angles of discharge of the same are adjusted so that the moments compensate each other. The duct means may open in the forward region of the fuselage and discharge air in downward direction for producing the desired nose-up moment.

By the downwardly directed air stream in the forward region of the aircraft, the flow of air over the wing surface is influenced to increase the lifting force acting on the wing. However, in an extreme case, only the pressure of the downwardly directed stream of air in the region of the front edge of the wing may be used for producing a force which, multiplied with the lever arm between discharge point and the pressure point or transverse axis of the wing structure, results in the desired nose-up moment for compensating the nose-down moment.

In the preferred embodiment of the invention, one or several outlets are provided in the region of the leading edges of the wings, and disposed so that the discharge air has a downwardly directed component.

During slow flight, for example when approaching an airfield, an air stream produced by blowers is divided into two parts which are discharged, respectively, on the leading and trailing edges of the wing structure, preferably along the entire length of the wings. The air stream discharged at the trailing edge of the wing causes a substantial deflection of the air flow and results in a nose-down moment about the transverse axis of the aircraft. The air stream discharged from the leading edge of the wing, and also air guiding means in the region of the leading edge of the wing, cause the development of an air vortex of the Rankine type below the leading edge of the wing, and this vortex deflects the air flow together with the air guide means so that the effective profile depth and profile thickness of the wing is increased, the vortex and the air guide means acting, in effect, as a leading edge of increased thickness. The deflection of the air flow in downward direction at the trailing edge of the wing, and the deflection of the air flow by the vortex at the leading edge of the wing, have a combined effect producing very high lift coefficient, while the aircraft is not sensitive against variations of the direction of the air flowing along the wing surfaces.

In contrast to the known flap constructions for wings, the arrangement of the present invention is capable of producing a complete compensation of the moments acting to turn the aircraft about its transverse axis, although no complicated mechanical devices or a turnable wing are required.

In addition to the complete equalization of the moment acting to turn the aircraft about a transverse axis, the arrangement of the present invention, and particularly the duct system for discharging air in the region of the leading edge of the wing, may also be used for maneuvering the aircraft. The control surfaces produce an insufficient effect during slow flight, since they are designed for flight at greater speeds, but by varying the amount of the air streams respectively discharged from the leading and trailing edges of the wing, or by varying the angle at which the air streams are discharged, steering effects can be produced.

During slow flight, the effect of the elevator can be replaced by discharging from the leading and trailing edges of the wings, respectively, air streams of such force that a pitch moment about the transverse axis of the aircraft is produced. This effect can be further increased by varying and adjusting the direction in which the air streams are discharged. In accordance with the resulting difference between the two moments, the aircraft rises or loses altitude. By producing on the two wings on opposite sides of the fuselage, unsymmetrical air streams of different velocity or direction, the effect of the rudder and of the ailerons can be achieved.

In the preferred embodiment of the invention, air streams are produced in ducts of the wings by crossflow blowers which have drum-shaped rotors formed by elongated vanes extending parallel to the axis of rotation of the rotor and producing a flow therethrough transverse to the axis of rotation. Crossflow fans or blowers of this type are disclosed, for example, in the U.S. Patents 2,942,773 and 3,096,931. Crossflow blowers of this type can be made long in axial direction, but have a very small volume as compared with axial or radial blowers. In accordance with the present invention, crossflow blowers are disposed with the axis extending in the direction of the elongation of the wings, preferably along the rear edge of the same, so that the fuselage and the wings move in an undisturbed air flow, permitting laminar surfaces. As compared with a gas turbine, the advantage of the crossflow blower resides in that the transported air volume is far greater than for a gas turbine of comparable size, so that the efficiency is better.

The combination of the duct system of the invention with crossflow blowers permits the use of the air streams produced thereby for propulsion during high speed flights, and for discharging air through the duct means at the leading edge of the wing for producing the vortex under the leading edge of the wing during slow flight so that the effective wing profile is changed by the vortex, and very high lifting forces result at low speeds of the aircraft, in addition to the fact that the moments about the transverse axis of the aircraft can be compensated.

In one embodiment of the invention in which two crossflow blowers are used, symmetrical propulsion forces can be produced corresponding to flight with two engines, even if the flight takes place with only one engine. As a result, the rudder can be reduced to dimensions corresponding to a single motor aircraft.

Another advantage of the embodiment of the invention in which blowers are used for producing the air streams acting in downward direction during start and landing, resides in that cold air is discharged at a comparatively low velocity, so that the runway is subjected to far less wear than by aircraft driven by gas turbines and producing a downwardly directed hot air stream.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

FIG. 1 is a diagram illustrating the variation of the moment coefficient for the leading portion of a wing, and FIG. 1a is a diagram illustrating the moment acting on the wing in a construction in which air is discharged only from the trailing edge of the wing;

FIG. 2 is a diagram illustrating the moment coefficient depending on variations of the discharge angles of the air streams discharged from the leading and trailing edges of the wing;

FIG. 2a is a diagram illustrating the compensation of the nose-down and nose-up moments in accordance with the present invention;

FIG. 3 is a schematic cross-sectional view taken on line 3—3 in FIG. 8 and illustrating one embodiment of the invention in a first operational position suitable for high speed flights;

FIG. 4 is a cross-sectional view corresponding to FIG. 3 but illustrating another operational position suitable for flights at low speed;

FIG. 4a is a cross-sectional view corresponding to FIG. 4 and illustrating hydraulic apparatus for operating movable devices;

FIG. 5 is a schematic view illustrating the flow conditions prevailing in the operation condition shown in FIG. 4;

FIG. 6 is a side elevation illustrating an aircraft provided with the wing and duct arrangement of FIGS. 3 to 5;

FIG. 7 is a plan view of the aircraft shown in FIG. 6 on a reduced scale;

FIG. 8 is a fragmentary plan view of the aircraft of FIG. 6 incorporating also the construction shown in FIG. 9;

FIG. 9 is a fragmentary schematic vertical sectional view illustrating a blower arrangement provided in the fuselage of the aircraft for producing warm de-icing air;

FIG. 11 is a cross-sectional view of the wing in accordance with a modified embodiment of the invention and illustrating an operational position for high speed flight;

FIG. 12 is a cross-sectional view corresponding to FIG. 11 but illustrating another operational position for low speed flight;

FIG. 13 is a cross-sectional view illustrating another embodiment of the invention in an operational position suitable for high speed flights;

FIG. 14 is a cross-sectional view corresponding to FIG. 13 but illustrating another operational position suitable for low speed flight;

FIG. 15 is a schematic view on a reduced scale illustrating the air flow conditions around the wing structure in the position of FIG. 14;

FIG. 16 and FIG. 17 are cross-sectional views illustrating a wing structure in accordance with another embodiment of the invention in the operational position for high speed flights, and in the operational position for low speed flights, respectively;

FIG. 18 is a cross-sectional view of a wing structure in accordance with another embodiment of the invention and illustrating an operational position suitable for high speed flights;

FIG. 19 is a cross-sectional view corresponding to FIG. 18 but illustrating another operational position suitable for take-off and start of the aircraft;

FIG. 20 is a cross-sectional view corresponding to FIGS. 18 and 19, but illustrating an operational position suitable for landing operations;

FIG. 21 is a fragmentary cross-sectional view of the leading portion of a wing in accordance with a modification of the embodiment of FIGS. 18 to 20;

FIG. 24 is a perspective view illustrating an aircraft provided with a wing structure and duct system in accordance with FIGS. 16–21;

FIG. 25 is a fragmentary vertical sectional view illustrating the tail end of the aircraft shown in FIG. 24;

FIG. 25a is a perspective view illustrating a sliding valve member used in the embodiment of FIG. 25;

FIGS. 25b and 25c are fragmentary sectional views illustrating the valve member of FIG. 25a in two different positions;

FIG. 26 is a sectional view illustrating a wing structure and a central gas turbine connected by ducts to the wing structure in accordance with another embodiment of the invention;

FIG. 27 is a fragmentary plan view of an aircraft with a central gas turbine and a duct system in accordance with the invention;

FIG. 27a is a fragmentary section on line XXVII—XXVII of FIG. 27 on a reduced scale and illustrating a cross section of the wing in accordance with FIGS. 20 and 21;

FIG. 28 is a fragmentary vertical sectional view illustrating another embodiment of the invention including a duct system in the fuselage connected with a gas turbine;

FIG. 29 is a fragmentary horizontal sectional view of the embodiment of FIG. 28;

FIG. 29a is a cross-sectional view taken on XXIX—XXIX in FIG. 29;

FIGS. 30 and 31 are rear views of the embodiment of FIGS. 28 and 29 illustrating, respectively two different operational positions;

FIGS. 32 and 33 are rear views corresponding to FIGS. 30 and 31 but illustrating a construction for twin propulsion engines;

FIG. 34 is a side elevation illustrating an aircraft provided with the embodiment of FIGS. 28 to 33;

FIG. 35 is a side elevation illustrating a modified embodiment of an aircraft according to the invention and incorporating the construction of FIGS. 28 to 31;

FIG. 36 is a cross-sectional view taken on line XXXVI—XXXVI in FIG. 35, and being shown on an enlarged scale;

FIG. 37 is a plan view of the aircraft of the embodiment of FIGS. 35 and 36 shown in an operational condition for high speed flights;

FIG. 38 is a plan view corresponding to FIG. 37 but illustrating an operational position for low speed flights; and FIG. 38a is a schematic cross-sectional view illustrating the wing structure of the aircraft shown in FIGS. 37 and 38.

Figure 10:
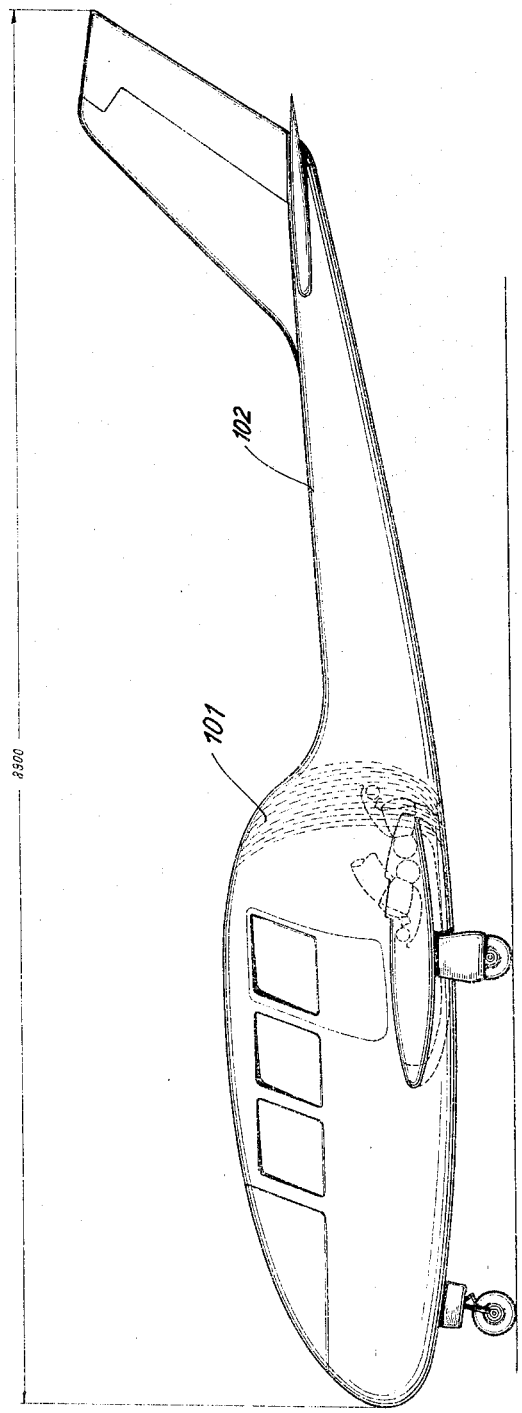
FIG. 10 is a side elevation illustrating a modified embodiment of the invention provided with blower means for producing hot de-icing air.

Referring now to the drawings, and more particularly to FIG. 1, the vertical axis represents the coefficient of the moment $C_{M1/4}$, and a horizontal axis the angle $\delta_G$ which is the angle defined by a rearward nozzle N and a horizontal axis. The horizontal axis of FIG. 1a represents the depth of the wing, a cross section of which is shown. The transverse axis 15 of the wing is spaced the distance $L/4$ from the leading edge of the wing, the entire depth being L. The discharge nozzle for air N is spaced from the rear edge so that the effective depth of the wing is $L_{eff}$. The moment coefficient $C_{M1/4}$ is equal to $M^1/4/q_\infty F \cdot L$ wherein $q_\infty$ is equal to $\rho/2 \cdot C^2\infty$. In these equations, M is the moment acting to turn the wing about axis 15, F is the length of the wing, L is the depth of the wing, and $\rho$ is equal to $\gamma/g$ wherein g is the acceleration of gravity, and $\gamma$ represents the air density. The suffix $\infty$ (infinite) represents a free air flow velocity. FIG. 1a shows the pressure over the depth of the wing. As the discharge angle $\delta_G$ increases, the underpressure in the rear portion of the wing increases so that the pressure acting on the rear portion of the wing is increased as indicated by the hatched area 13, as compared with the normal pressure distribution when no air is discharged from the rear edge of the wing. Consequently, the pressure distribution is changed, and the underpressure in the area 13 causes turning of the wing about axis 15 in the direction of the arrow 14. The moment is a negative moment causing a nose-down movement of the wing and aircraft. In accordance with the present invention, a flap or other guide means 12 is provided on the leading edge of the wing as shown in FIG. 2a, and extends at an angle $\delta_N$. This causes formation of a vortex, indicated at 12a in FIG. 5, and resulting in an effective extension of the wing in forward direction, and in an increase of the effective profile thickness and profile curvature of the leading edge.

As a result of the different flow conditions caused by the guide means 12, underpressure is produced in the region of the leading edge of the wing, corresponding to the hatched area 16 whereby a nose-up moment develops in the direction of the arrow 17 compensating the moment produced by the underpressure represented by the area 13. The coefficient $C_{M1/4}$ of the resulting moment is shown in FIG. 2, assuming the uniform variation of the angle $\delta_G$ from 0 to 90 simultaneously with a uniform variation of the angle $\delta_N$ from 0 to 110. It will be apparent from FIG. 2 that the moment can be fully compensated by a slight further adjustment of one of the angles, for example by turning the discharge nozzle N.

The guide means 12 of FIG. 2a is used during slow flight, and adjustments can be made for compensating the moments during the entire interval between flight at high speed and maximal lift.

In aircraft having symmetrical wings on both sides of the fuselage, equal resulting moments acting in the same direction are produced on both sides of the fuselage resulting in the effect of the elevator for turning the airplane about its transverse axis.

A further control effect can be achieved by unsymmetrical throttling or distribution of the air stream discharged from the outlet at the rear edges of the wings, and also from outlets at the front edges of the wings, it will be explained hereinafter. By changing the angle of the dischahrged air streams differently for the two wings, the effects of the rudder and of the ailerons can be obtained so that it becomes possible to construct aircraft comprising no fuselage portions projecting from the wings, and being only a wing.

In the embodiment illustrated in FIGS. 3 to 8, two rows of crossflow blowers 2 and 3 are disposed in the region of the rear edges 11b of the wings 11a. The cross-flow blowers rotate about shafts whose ends are coupled to each other. As best seen in FIG. 8, the shafts of the crossflow blowers 2 and 3 are driven from the crank shafts 95 of a pair of two-stroke motors 84 whose cylinders 93 are located in ducts 92, 92' provided in the fuselage of the aircraft, as best seen in FIG. 9. The forwardly located motor is shown in side elevation, and a rearwardly located motor is shown in section in FIG. 9. Housings 91 enclose the crank shafts and cranks. Crossflow blowers 94, driven from crank shafts 95 by transmission means, not shown, blow air which is sucked from the surface of the fuselage through ducts, only one suction duct 94a terminating in an inlet 94b being shown in FIG. 9. The air passing through duct 92 is heated by the cylinder 93, and passes forwardly first through ducts 92 in the fuselage, and then into ducts 92a, 92b extending along the leading edges of the wings 11a. Since the air is heated, it serves to de-ice the leading edges of the wings, and more particularly pivoted flaps 12 mounted at the leading edges of the wings, as best seen in FIGS. 3 and 4. Duct 92a is provided in the flap. The air discharged by the rearwardly located blower 94 into duct 92' in the fuselage, is also heated, and duct 92' extends through the tail of the fuselage into the region of the rudder and elevators where the air heated by cylinder 93 is discharged to heat the control surfaces, as shown for the modified construction of FIG. 10 where the duct 102a discharges through outlet 102b in the region of the control surfaces at the tail end of the aircraft. However, the embodiment of FIG. 10 is different from the embodiment of FIG. 8 inasmuch as the forwardly located blower 101a discharges the air into duct 102a, while the rearwardly located blower 101b discharges forwardly through a duct 102b, corresponding to the duct 92 and located in the fuselage, into ducts extending along the leading edge of the wing. The arrangement of cylinders 93 of motors 84 in the arrangement of FIG. 10 corresponds to the arrangement of FIG. 9. The arrangement may be further modified by blowing heated air along channels provided in the rear edges of the wings to reduce turbulence.

In the embodiment of FIG. 10, the air is sucked by the blowers through slots 101 in the fuselage provided in the region where the greatest cross section of the fuselage is reduced, and where normally a turbulent air flow will be created. By sucking the surface layer of the air into the ducts, the flow is influenced to closely follow the contour of the airplane. Rearwardly of the inlet slots 101, turbulence will be created, and therefore it is advantageous to make the tail end 102 on which the control surfaces are mounted with the smallest possible surface. Referring now to FIGS. 3 to 5 which illustrate a wing construction which may be provided in aircrafts shown in FIGS. 6 to 10, the wing 11a is provided with a flap or corresponding air guide means 12 which is mounted on the leading edge of 12c of the wing for pivotal movement about an axis extending parallel to the transverse axis of the aircraft and in the direction of the elongation of the wings. Flap 12 may be provided with the de-icing duct 92a, as explained above. In the position for high cruising speeds shown in FIG. 3, the flap is in a position forming a streamlined surface with the other surfaces of the wing and also closing a duct 11 extending from the rear edge of the wing toward the leading edge, and having an outlet opening 46 bounded by a surface of duct 11 which merges into the inner surface 47 of flap 12 in the position shown in FIG. 4 in which the aircraft is intended to be operated at low speed. Crossflow blowers 2 and 3 are provided along the trailing edges of the wings, and have discharge means 9 and 7 which also constitute the stator of the crossflow blowers. All crossflow blowers which are arranged in one row, can be turned between the position shown in FIG. 3 and the position shown in FIG. 4. Crossflow blowers 2 of one row are turned through an angle of 90° from a position in which discharge means 7 discharges through outlet 36 in rearward horizontal direction, as shown in FIG. 3, and a position shown in FIG. 4 in which discharge means 7 has been turned 90° to discharge air in a vertical downward direction.

The edges 2', 2" and 3', 3" of the stators of blowers 2 and 3 constitute the inlets through which air is sucked into and through the rotor to be discharged through the discharge means 7 and 9. In the position shown in FIG. 3, the inlet of blower 2 communicates with a diffuser 6 whose cross section increases toward the rotor so that the air speed is reduced and the static pressure increased. Within the blower the air is again accelerated, and the increased static pressure is again transformed into velocity in the discharge nozzle 36. When stator and discharge means 7 is turned to the position shown in FIG. 4, air is sucked through the inlet between the wall portion 2' and 2" along the outer surface of the diffuser 6.

The forwardly located blower means 3 have a stator and discharge means 9 which is turned through an angle of substantially 180°. The stationary diffuser 5 is partly formed by a flap 44 which can be turned about a pivot axis 44a between the lower position shown in FIG. 3 separating duct 11 from the inlet of blower means 3 by engaging the wall portion 3', and the position shown in FIG. 4 in which the end portion 45 engages the outlet portion 35 of the turned discharge means 9 to establish communication between the outlet 35 and duct 11. In the position of blower means 3 shown in FIG. 4, the air is sucked from the lower wing surface into the blower rotor and from there discharged into duct 11. Since in this position of the blowers, flap 12 has opened outlet 46 of duct 11, the air blown by blower 3 is discharged through outlet 46 along flap surface 47 to produce a nose-up moment compensating the unavoidable nose-down moment produced by the rear blower means 2 in the position of FIG. 4, as explained with reference to FIGS. 2 and 2a.

In the position of FIG. 3, the air is discharged in rearward direction by both blowers, and the air discharged by blower 3 follows the outer contour of the lower portion of the discharge means 7 of blower means 2. During flight at high speed, the discharged air will aid in the propulsion, and the diffusers 5 and 6 will suck in the air layer along the top surface of the wing.

During starting operations, the stators of the blower means are turned slightly so that air discharged through nozzles 35 and 36 has a downward component whereby the lift coefficient is increased.

In the position for slow flight, the rear blower means 2 produces suction in the region 41 and blows downwardly through nozzle 36 so that a very high lift is produced. The air flowing along the top surface of the rear diffuser 6 must be deflected 90° to flow into the blower, which is facilitated by the very large inlet opening 41 between the wall portions 2' and 2" of blower means 2. It is possible to adjust the stator of blower means 2 to a position in which the discharge through nozzle 36 is directed slightly forwardly so that a strong brake effect suitable for steep landing operations is produced.

Since in the slow flight position of FIG. 4, the air is sucked in from below through the wide inlet opening 10 of blower means 3, and discharged through the duct 11 and the reduced portion 46 thereof, the airflow is accelerated in the reduced portion 46 and discharged along the surface 47. As best seen in FIG. 5, this results in the formation of a vortex 12a, which is a rotating body of air which does not flow along the wing. The air flow cannot move into the region of the outlet 46, and the vortex 12a constitutes, in effect, a new leading edge of the wing, resulting in a different effective profile of the wing corresponding to the broken line in FIG. 5 which indicates an area which cannot be penetrated by the air flow.

Due to the different effective profile of the wing, very slow speeds can be maintained, the lifting forces are very high, and the nose-up and nose-down moment can be fully compensated.

As shown in FIG. 4a, flap 12 has a projection 12a pivotally connected with a link 12b operated by the piston 12c of a hydraulic motor 12d which is controlled by suitable valve means, not shown, by the pilot to move flap 12 between the positions shown in FIGS. 3 and 4. The gear 3b is secured to a shaft on which the stators and discharge means 9 of the blowers 3 are mounted, and meshes with a rack bar 3c connected by a link 3d to a piston 3e in the cylinder 3f so that the pilot can turn the blower means through an angle of substantially 180° from the position shown in FIG. 3 to the position shown in FIG. 4.

The stator and discharge means 7 of blower means 2 is connected to a link 7a to a piston 7b of a hydraulic motor 7c which is controlled by the operator to turn the blower means 2 between the positions shown in FIGS. 3 and 4.

Flap 44 is connected by link 44a to a piston 44b of a hydraulic motor 44c, and can be operated under control of the pilot between the positions shown in FIGS. 3 and 4.

The operations of the several hydraulic motors must be carried out in a certain sequence, for example, stator and discharge means 7 must be first turned to the position of FIG. 4 before stator and discharge means 9 can be turned from the position of FIG. 3 to the position of FIG. 4. The sequence of the operation is either determined by the pilot, or may be automatically carried out in a manner which will be obvious to those skilled in the art.

The wing structure and arrangement illustrated in FIGS. 3 to 5 has a negative ground effect since air is sucked by blower means 3 from under the wing 11. Therefore, it is preferred to mount the wings 11a on the upper portion of the fuselage, as shown in FIG. 6, when the aircraft is designed for smooth runways. An aircraft intended to land on rough surfaces, may have the wings placed lower, as shown in FIG. 10.

The embodiment of FIGS. 11 and 12 operates on the same principle as the embodiment of FIGS. 3 to 5. Blowers 2 and 3 are provided along the rear edge of the wing 23 and have stators 7 and 9 turnable between the positions shown in FIGS. 11 and 12. For vertical take-off and landing operations, a great amount of air must be discharged along the leading edge of the wing, and the duct 11 of FIGS. 3 and 4 cannot be widened sufficiently for this purpose without weakening the wing structure. In the embodiment of FIGS. 11 and 12, the wing structure includes a main wing portion 23, and a cover means 21 which has the same contour and area as the top surface 24 of main portion 23. Cover 21 can be moved between the high speed flight position shown in FIG. 11 in which it is directly superimposed on the top surface 24 of the main portion 23, and the position shown in FIG. 12 in which cover means 11 is spaced from the main portion of the wing, and forms with the top surface 24 a duct 22 extending from the trailing edge of the wing to the forward edge, and including a downwardly directed outlet 20. Links 25 are pivotally connected to the cover means 21 and to main portion 23, and can be turned by hydraulic means 25a and 26a between the position shown in FIG. 11 in which they are located in recesses of the main portion 23, and the position of FIG. 12 in which they project upwardly from the main portion to hold the cover means 21 spaced from the same. The diffuser means 5 and 6 are stationarily mounted on the wing, and diffuser 5 has an upper wall portion aligned with the end portion 27 of cover means 21 in the raised position of the same shown in FIG. 12. A guide means 29 is pivotally mounted at 29a on the main portion 23, and is operated by hydraulic means 29b between the position shown in FIG. 11 abutting the top surface of main portion 23, and the raised position of FIG. 12 aligned with the end portion 9' of the discharge means 9 of blower means 3. Another guide member 29c is mounted on a pivot 29d and can turn between the positions shown in FIGS. 11 and 12 so that turning of stator and discharge means 9 of blower 3 is possible.

The hydraulic apparatus for turning stators and discharge means 7 and 9 of blowers 2 and 3 correspond to the apparatus described with reference to FIG. 4a.

In the position of guide member 29 shown in FIG. 11, the cross section of passage 30 of diffuser 5 increases toward the rotor of blower means 3, that is in the direction of the air flow. In the position of guide member 29 shown in FIG. 12, the cross section of passage 30 increases in the direction away from blower 3, again in the direction of the air flow.

It will be seen that in the position of FIG. 11, the wing has a profile suitable for high speed flight, and that the blowers 2 and 3 produce propulsion forces by blowing in rearward direction.

In the position of FIG. 12, the thickness of the wing is increased, and a vortex is formed below the leading edge of the wing by air discharged through outlet 20 from the wide duct 22 so that the effective profile of the wing is made even more suitable for slow flight, and for vertical take-off and landing operations. In order to produce a particularly great air flow out of outlet 20, blower means 3 is shown to have a greater diameter and output than blower means 2. In this manner, the nose-down moment can be fully compensated, and a vertical take-off becomes possible.

In the embodiment of FIGS. 13 and 14, the blowers 132 and 133 are not located in the region of the trailing edge of the wing but in a forward portion of the same. The stators 136 and 137 are turnable between the position shown in FIG. 13 and the position shown in FIG. 14. A flap 145 is pivotally mounted at the leading edge of the wing, and is flush with the wing surface in the high speed position of FIG. 13. In the low speed position of FIG. 14, flap 145 projects downward and forward and increases the thickness of the leading edge. Another flap 144 is mounted for pivotal movement on the top surface of the wing, and has a high speed position flush with the same and permitting air to enter through an inlet 130 in the upper surface of the hollow wing. In the position of FIG. 14, flap 144 closes inlet 130.

A turntable valve member 140 is mounted for pivotal movement in the region of the rear edge of the wing and has a high speed position shown in FIG. 13 closing an opening in the lower wall of the wing. In the position of FIG. 14, valve member 140 is angularly displaced, so that two inlet openings 141 and 142 are formed in the region of the underside of the rear edge of the wing.

In the position of FIG. 13, one wall 137a of stator 137 engages the inner surface of the wing, so that between the flap 144 and wall portion 137, a diffuser passage 134 is formed through which air is sucked into the rotors of blower means 132, 133 which discharge the air in the direction of the arrows 135 in rearward direction along the underside of the wing. In this position, maximum propulsion is obtained for high speed flights.

In the position of FIG. 14, the inlet 130 is closed by flap 144, and the stators 136 and 137 are turned so that the inlets thereof are directed toward the rear of the cavity in the wing. At the same time, the valve member 140 is opened so that air can be sucked through the openings 141, 142 from the region below the rear edge of the wing, accelerated by the blowers, and discharged in downward direction forwardly of the transverse axis of the wing as indicated by arrows 147.

As a result, air will be circulated below the wing surface within the area bounded by the broken line 151 shown in FIG. 15, and the effective profile of the wing will be determined by flap 145 and by the air mass below the wing within the broken line 151, corresponding to a far thicker wing more suitable for low speed flight than slim wing profile effective in the position of FIG. 13.

In this manner, the lift is substantially increased in the position of FIG. 14, and the nose-up moment and nose-down moment are compensated.

The several movable elements of the wing structure shown in FIGS. 13 to 15, are operated by hydraulic means, or mechanical linkages, substantially as described with reference to FIG. 4a in a manner which will be evident to one skilled in the art.

While in the above explained embodiment of the invention, blower means are provided in the wing structure for supplying the air which is discharged from the wing, the embodiments which will now be described with reference to FIGS. 16 to 27a, provide ducts with outlets along the trailing and leading edges of the wing, and the air is supplied from a compressor located in the fuselage and driven by the propulsion plant of the aircraft.

FIGS. 24 and 25 show a gas turbine 241 located at the rear end of the fuselage. Air is supplied to the turbine through the inlet channel 255, and combustion gases are discharged through the outlet 256. Bypass air passes outwardly of the turbine. A control valve ring 251 is shiftable between the position shown in the upper portion of FIG. 25 and the position 251a shown in the lower portion of FIG. 25, and closes in the latter position the annular bypass channel through which air is permitted to flow in the position 251 of the control valve ring. The tubular structure surrounding the bypass passage is formed with slots 254a, as best seen in FIG. 25b and 25c, and is surrounded by a valve ring 252 having corresponding slots 254. Valve ring 252 can be turned between the position shown in the upper half of FIG. 25 and in FIG. 25c, and the position shown in the lower half of FIG. 25 and in FIG. 25b. In the latter position, bypass air whose passage is blocked by control valve ring 251 in the position 251a, can pass through the aligned slots 254a and 254 into a duct 253 which has an annular portion 253a surrounding valve ring 252. The control valve ring 251, and valve ring 252 are simultaneously operated by conventional apparatus, not shown, so that the bypass air is either discharged through outlet 256 during high speed flights, or discharged in forward direction into a duct 253 from where it is guided into ducts 242 and 243 extending, respectively along the leading edges of the wing and the trailing edges of the wing, as best seen in FIG. 24. Ducts 242 and 243 are provided with outlets for the discharge of air as schematically indicated by arrows in FIG. 24, and as will be described hereinafter in greater detail with reference to FIGS. 16 to 21.

Two gas turbines are provided, each of which has a duct 253 connected with ducts 242 and 243. In order to prevent communication between ducts 253 in the event of failure of one of the gas turbines, an automatic check valve 257 is provided in each duct 253, and closes when air discharged from the operative turbine into the respective duct 253 tends to enter the other duct 253 and flows in a direction opposite to the arrow shown in FIG. 25.

Referring now to FIGS. 16 and 17 which illustrate one embodiment of a wing which can be used in aircraft of the type described with reference to FIGS. 24 and 25, and the wing 166 has a first condition for high speed flight in which its profile is narrow and streamlined. In the thickened condition shown in FIG. 17, ducts 176 and 177, corresponding to ducts 242 and 243 are formed below the wings so that the profile of the wings is changed in a manner suitable for flight at low speed. Air guide means located at the trailing and leading edges of the wing are operable between the condition of FIG. 16 and the condition of FIG. 17 to form the ducts. The forward air guide means includes a leading part 160 pivotally mounted at 127 on the leading edge of the wing 166, a middle part 161, and a trailing part 152 which is guided by rollers 178 along a recess 168 in the underside of the wing, since parts 160, 161 and 162 are articulated to each other and to the wings, they can be shifted from the flat condition shown in FIG. 16 to the position shown in FIG. 17 forming duct 176. The middle part 161 is provided with a row of outlet openings 171 through which the air is discharged in downward direction when a nose-up movement is desired. The rear air guide means include three articulated parts 163, 164, 165, the trailing part 165 being pivotally connected to the trailing edge of the wing at 173, and the leading part 163 having an end provided with rollers guided in recess 165 so that the air guide means can be flattened to assume the position shown in FIG. 16, or placed in the position of FIG. 17 forming the duct 177. Middle part 164 has a row of outlets 174 through which air is discharged in downward and rearward direction, and trailing part 165 has in the upper portion thereof an outlet 173 for the discharge of air along the outer rearward face of part 165, also in downward and rearward direction.

By shifting parts 162 and 163 between intermediate positions, the profile of the wing can be further varied.

Figure 23:
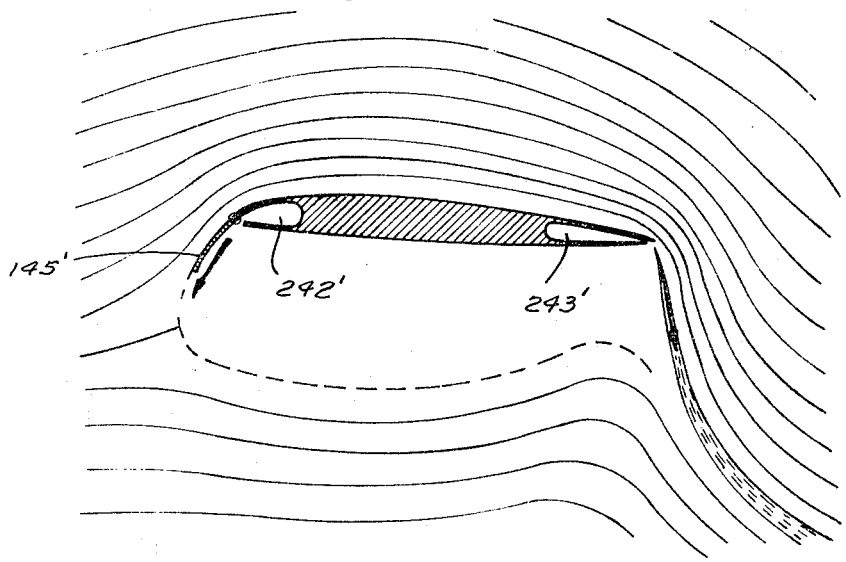
FIG. 23 is a fragmentary schematic view illustrating the air flow conditions for another wing structure similar to FIGS. 16 to 21.

While the air streams in ducts 176 and 177 are advantageously produced by feeding air to the ducts from the gas turbine, as described with reference to FIG. 25, it is also possible to provide blowers in the fuselage, and to connect the outlets of the blowers to ducts 176 and 177. The air flow about the profile of a wing in the condition of FIG. 17 corresponds substantially to the air flow shown in FIG. 5 and also in FIG. 23. FIG. 23 shows a modification in which ducts 242' and 243' are provided in the leading and trailing edges of a wing, and in which a flap 145' can be operated between a position lying substantially flat on the underside of the wing, and the position illustrated in FIG. 23 in which an air mass below the wing influences the effective profile of the wing. Ducts 242' and 243' have outlets for discharging the air in the direction indicated by arrows in FIG. 23.

The operating means for moving parts 160 and 165 of the embodiment of FIGS. 16 and 17, and the flap 145' in the embodiment of FIG. 23, are not illustrated, and correspond substantially to the devices explained with reference to FIG. 4a.

The embodiment of FIGS. 18 to 20 is similar to the embodiment of FIGS. 16 and 17, but the rear air guide means include a long flap 180 which forms the rear edge of the wing in the high speed position of FIG. 18, and substantially deflects the air in the intermediate position of FIG. 19, and in the steeply inclined position of FIG. 20.

The rear air guide means include an angular lever 181 pivotally mounted on the wing at 118a, and operated by a mechanism including an hydraulic motor 189. Lever 181 is pivotally connected at 183 to a link 182 whose end has rollers 184 guided in channels of the rear flap 180. By operation of the hydraulic motor 189, the air guide means can be operated to assume the three positions shown in FIGS. 15 to 19. The edge 202 of flap 180 moves along an arcuate path, and the upper and forward end of flap 180 is shaped to match the contour of the main portion of the wing in the position of FIG. 18. In the landing position of FIG. 20, duct 188 has its largest cross section. When air is supplied to duct 188 in the positions of FIGS. 19 and 20, it is discharged between the edge 202 and the rear edge of the main wing portion 187 and flows in rearward and downward direction along the outer surface of flap 180, substantially as shown in the schematic view of FIG. 22. In this modified embodiment, a duct 243″ is provided along the rear edge of the wing in a fixed wing structure, and the flap 180' is turnable about the pivot 180″. The construction of the leading edge of the wing in FIG. 22 corresponds to the construction described with reference to FIG. 23, and it will be seen that the flap 180' has the effect of increasing the effective thickness of the rear edge of the wing.

Figure 22:
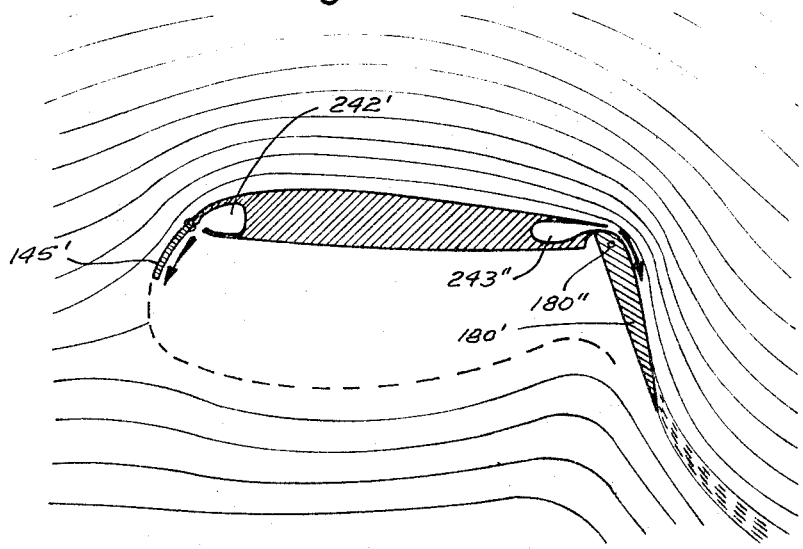
FIG. 22 is a fragmentary schematic cross-sectional view illustrating the air flow conditions of a wing structure similar to the construction of FIGS. 18 to 21.

Referring again to FIGS. 18 to 20, the forward air guide means comprise three articulated parts 190, 191, and 193 connected by pivots 190a and 192a. The leading part 190 is pivotally mounted on the leading edge of the wing, and the trailing part 193 has rollers guided in channels 195 at the underside of the wing, so that the air guide means can be moved between the flat position shown in FIG. 18 which is suitable for high speed flights, to the position of FIG. 20 in which duct 198 has its largest cross section. The middle part 191 is provided with a row of outlets 201 through which air is discharged in downward and forward direction, as in the other embodiments. The body of air forming underneath the wing structure shown in FIG. 20 corresponds substantially to the illustration of FIG. 23. The collapsible construction of the air guide means has the advantage that the profile of the wing can be made extremely narrow as is advantageous for high speed fllights since no space need be provided for ducts as shown in FIGS. 22 and 23.

As compared with the construction of FIGS. 16 and 17, the large flap 180 has the advantage that a braking effect may be produced during landing operations, even if the power plant of the aircraft fails or if no air can be supplied to the ducts 188 and 189.

The wing illustrated in FIG. 21 has the same rear air guide construction as shown in FIGS. 18 to 20 including flap 180.

In the embodiment of FIG. 21, the duct 219 is formed by two parts. The forward part 210 is mounted for turning movement on the leading edge of the wing by means of rollers 210a which are guided in a slot 210b. In the high speed condition of the wing, part 210 is located in the position indicated in broken lines and forms the leading edge of the wing. To arrive in this position, part 210 is first turned about rollers 210a, whereupon the rollers are moved into slots 210b so that the rear edge of part 210 abuts the leading edge of the main part of the wing. The trailing part 211 is provided with rollers 212 guided in the channel 213. A link 217 is pivotally mounted on the wing, and articulated at 218 to part 211. In the retracted position of part 211, it is located in a recess including recess portion 216 for the projection 215 and 216a for the link 217. Part 211 is placed in this condition when high speed flight is desired, and at the same time, the rear air guide means are placed in the position shown in FIG. 18 so that the profile of the wing is narrow.

In the position of FIG. 21, a duct 219 is formed between parts 211 and 210, and air is discharged from the duct through outlet 202 so that a body of air forms below the wing structure and changes the effective profile of the wing as is desired for slow flight, and for take-off and landing operations. A small part of the air in duct 219 may be permitted to escape through the gap 203 between the part 210 and the leading edge of the main portion of the wing.

FIG. 26 illustrates another manner in which air may be supplied to the ducts 176 and 177 shown in FIG. 17. The bypass turbines 260 have outer walls surrounding the annular bypass passage 260a and formed with openings 263 which can be closed by member 263a. When member 263a is opened, air is discharged from the bypass passage 260a into the duct 265 which has lateral openings 266 and 267 communicating with ducts 176 and 177. A control valve ring 264 can be shifted between the position shown in the lower portion of FIG. 26 in which the outlet of the bypass passage 260a is closed, and the position shown in the upper portion in which the outlet passage 262 is open. When member 263a opens the openings 263, control valve ring 264 closes the outlet of the bypass passage. A deflector 268 can be operated between a position retracted into the wing, and a position located rearwardly of the outlet 262 for deflecting the gaseous medium discharged by the gas turbine 260.

FIG. 27 shows an aircraft construction provided with the wing construction of FIG. 21, as also shown in the cross section of FIG. 27a. Members 255 are provided at the ends of the wings to maintain the lifting force at the ends of the wings. The air is guided from the first compressor stages, or from the bypass stage of a centrally disposed gas turbine 271 through ducts 272 and 273 to the ducts 219 and 188 which extend along the edges of the wings, as described with reference to FIGS. 29 and 27a.

FIGS. 28 to 31 illustrate another embodiment of the invention. The bypass air passing through passage 286 of a gas turbine 280 is guided into a diffuser 281 which is mounted by hinge means 291 for pivotal movement about a vertical axis 283. The angular displacement of the diffuser is indicated by the arrow 284. A reversing guide vane 282 is preferably operated together with the diffuser 281, and can also be turned about pivot means 285 between the position shown in solid lines in FIG. 29 and the position shown in chain lines. Pivot means 285 is mounted on the diffuser 281.

When diffuser 281 is in the position illustrated in FIGS. 29 and 28 in solid lines, the bypass air discharged from the annular passage 286 enters the diffuser duct 293 whose cross section increases in the direction of the flow. Duct 293 is curved and has a portion 294 for reversing the flow. Only one gas turbine is illustrated, the other being arranged symmetrically to the vertical plane of symmetry of the aircraft together with corresponding diffuser arrangement.

The discharge ducts 294 and 294' of the two gas turbines join each other in the region 295. An automatic check valve flap 296 and 296' is provided in each duct 294 and 294' to close one of the ducts whose gas turbine is inoperative, so that no air can enter into such duct from the other duct. Check valve flap 296 has a projecting portion 297 which is of such shape as to respond to an opposite air flow to close flap 296 or 296'. The shape of members 296, 297 is best seen in the cross section of FIG. 29a. The common duct 295 is connected to ducts extending along the leading and trailing edges of the wings, as explained with reference to FIG. 24.

During flights at high speed, no air is to be supplied to the ducts in the wings, and consequently the diffuser is placed in the inoperative position indicated by the broken line 289 in which the gas turbine discharges into the open air. At the same time, the deflecting vane 282 is placed in the position shown in chain lines in FIG. 29.

FIG. 30 is a rear view of the arrangement. Only the outer wall 288 of the diffuser 281 is visible in the position for rapid flight, and the reversing vane 282 is shown in the corresponding position. The surface 300 indicates the U-shaped discharge outlet of the bypass passage.

When the aircraft is adjusted for slow flight, diffuser 281 is moved to cover this area. The area 302 indicates the cross section on which the combustion gases of the turbine are discharged. In FIG. 31, diffuser 281 is shown in the position for slow flight, covering the U-shaped outlet of the bypass passage 300, but leaving the outlet passage 302 for the combustion gases open. The reversing vane 282 is retracted and inoperative in the position of FIG. 31.

FIGS. 32 and 33 correspond to FIGS. 30 and 31, respectively, illustrating an arrangement in which two turbines are arranged above each other on each side of the aircraft. The combustion gases are discharged through the outlets 221, and the bypass air is discharged through cross sections 322. Corresponding parts in FIGS. 30, 31 and 32, 33 are indicated by like reference numerals provided with primes. FIG. 33 shows the diffuser 281' in a position deflecting the bypass air discharged through outlet 322, while deflecting vane 282' is in a position deflecting the combustion gases of the turbine toward the forward end of the aircraft.

FIG. 34 is a side elevation of an aircraft provided with a turbine arrangement as described with reference to FIGS. 28 to 31 and illustrates the position of the gas turbine 280 and of the diffuser 281 rearwardly of the wing. The wing construction is not shown in detail, and may correspond to FIG. 22.

FIGS. 35 to 38a illustrate another embodiment of the invention. A duct 350 extends through the entire length of the fuselage and opens in a discharge nozzle 351 near the nose of the aircraft, instead of being guided to ducts along the leading edge of the wings. The trailing edges of the wings may be constructed as described with reference to FIGS. 18 to 20 with flaps 180, as also shown in FIG. 38a. The nose-down moment produced by flap 180 is compensated by the air discharged through outlet nozzle 351. FIG. 35 is schematic, and FIG. 36 more clearly shows that duct 350 is provided in the lower portion of the fuselage and is of circular cross section. Near the nose of the aircraft, duct 350 has a downwardly curved portion 351 terminating in a nozzle which can be closed by two flaps 362 having pivot means extending in longitudinal direction of the fuselage.

Two gas turbines 280 are mounted at the rear end of the fuselage, as described with reference to FIGS. 28 to 31, and provided with diffusers 281. The duct portion 295 common to both gas turbines are connected with duct 350, and also two ducts 380 which communicate with ducts 188 along the rear edges of the wings.

FIG. 37 shows the aircraft in a position for fast flight, with gas turbines 280 discharging into the open, and with outlet 351 closed by flap 362. Flaps 180 are in the position shown in FIG. 18.

In the condition for slow flight, diffusers 281 receive the bypass air of the gas turbines and deflect the air through curved conduits 294 into the main conduit 295, 350.

In this embodiment, the nose-down moment produced by flap 180 in the position of FIGS. 38 and 38a, is compensated by a nose-up moment produced by air discharged through outlet 351 in downward direction acting on the long lever arm between outlet 351 and the transverse axis of the aircraft.

It will be understood that each of the elements described above, or two or more together, may also find a useful application in other types of duct arrangements for aircrafts differing from the types described above.

While the invention has been illustrated and described as embodied in a wing structure provided with air outlets along the leading and trailing edges thereof, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an aircraft, in combination, a wing structure including duct means opening in the region of the leading edge of said wing structure; crossflow blower means having an axis extending substantially in the direction of the elongation of the wing structure and mounted on the same in the region of the trailing edge for producing a stream of air in said duct means; and means in the region of the leading edge of said wing structure for causing a downwardly directed outflow from said duct means whereby a nose-up moment is produced.

2. In an aircraft, in combination, a wing structure including duct means opening in the region of the leading edge of said wing structure; crossflow blower means having an axis extending substantially in the direction of the elongation of the wing structure and mounted on the same in the region of the trailing edge for producing a stream of air in said duct means; and air guide means in the region of the leading edge of said wing structure having a first position for closing said duct means and a second position downwardly projecting from the wing structure for causing a downwardly directed outflow from said duct means whereby a vortex is formed below the leading edge of the wing structure and a nose-up moment is produced.

3. In an aircraft, in combination, a wing structure including duct means opening in the region of the leading edge of said wing structure; crossflow blower means having an axis extending substantially in the direction of the elongation of the wing structure and mounted on the same in the region of the trailing edge for producing a stream of air in said duct means; and flap means mounted in the region of the leading edge of said wing structure for turning movement about a transverse axis extending in direction of the leading edge of the wing structure and being turnable between a first position closing said duct means and lying flat along the bottom face of said wing structure and a second position downwardly projecting from the wing structure for causing a downwardly directed outflow from said duct means whereby a vortex is formed below the leading edge of the wing structure and a nose-up moment is produced.

4. In an aircraft, in combination, a wing structure including duct means opening in the regions of the leading and trailing edges of said wing structure; blower means mounted in said wing structure in the region of the trailing edge of the same and having a first position for discharging air in rearward direction, and a second position for discharging air in downward direction from the trailing edge of the wing structure and for producing a forwardly directed stream of air in said duct means; and means in the region of the leading edge of said wing structure for causing in said second position a downwardly directed outflow from said duct means whereby a nose-up moment is produced in said second position.

5. In an aircraft, in combination, a wing structure including duct means opening in the regions of the leading and trailing edges of said wing structure; blower means mounted in said wing structure in the region of the trailing edge of the same and having a first position for discharging air in rearward direction, and a second position for discharging air in downward direction from the trailing edge of the wing structure and for producing a forwardly directed stream of air in said duct means; and flap means mounted in the region of the leading edge of said wing structure for turning movement about a transverse axis extending in direction of the leading edge of the wing structure and being turnable between a first position closing said duct means and lying flat along the bottom face of said wing structure and a second position downwardly projecting from the wing structure for causing a downwardly directed outflow from said duct means whereby a vortex is formed below the leading edge of the wing structure and a nose-up moment is produced.

6. In an aircraft, in combination, a wing structure including duct means opening in the regions of the leading and trailing edges of said wing structure; a leading and a trailing crossflow blower means having parallel axes extending substantially in the direction of the elongation of the wing structure and mounted on the same in the region of the trailing edge of the same, each blower means having a discharge means, said blower means having a first position in which said discharge means point rearwardly for discharging air in rearward direction, and a second position in which the leading blower means discharges air into said duct means and in which the trailing blower means discharges air in downward direction in the region of the trailing edge of the wing structure whereby a nose-down movement is produced; and means in the region of the leading edge of said wing structure for causing a downwardly directed outflow of the air discharged by said leading blower means into said duct means whereby a nose-up moment compensating the nose-down moment is produced.

7. In an aircraft, in combination, a wing structure including duct means opening in the regions of the leading and trailing edges of said wing structure; a leading and a trailing crossflow blower means having parallel axes extending substantially in the direction of the elongation of the wing structure and mounted on the same in the region of the trailing edge of the same, each blower means having a discharge means, said blower means having a first position in which said discharge means point rearwardly for discharging air in rearward direction, and a second position in which the leading blower means discharges air into said duct means and in which the trailing blower means discharges air in downward direction in the region of the trailing edge of the wing structure whereby a nose-down movement is produced; and flap means mounted in the region of the leading edge of said wing structure for turning movement about a transverse axis extending in direction of the leading edge of the wing structure and being turnable between a first position closing said duct means and lying flat along the bottom face of said wing structure and a second position downwardly projecting from the wing structure for causing a downwardly directed outflow from said duct means whereby a vortex is formed below the leading edge of the wing structure and a nose-up moment is produced compensating the nose-down moment.

8. An arrangement as set forth in claim 7 including diffuser means mounted in the region of the trailing edge of said wing structure and having inlet means disposed to receive air flowing along the top surface of said wing structure; and a closure means mounted in the region of the trailing edge of the wing structure for movement between a first position cooperating with said diffuser means to supply air to said leading blower means while closing said duct means in said first position of said blower means, and a second position for connecting said duct means with said discharge means of said leading blower means and separating said diffuser means from the same.

9. An arrangement as set forth in claim 8 wherein said diffuser means include separate diffusers for said leading and trailing blower means, said inlet means of said diffusers including a leading slot and a trailing slot located in the region of the top surface of the wing structure.

10. In an aircraft, in combination, a wing structure including a lower main portion, and a cover plate having a shape and area matching the top surface of said main portion and being mounted on the same for movement between a first position directly superimposed on said top surface of said main portion and forming an air foil with the same, and a second position spaced from said top surface of said main portion and forming with the same duct means extending from the leading edge to the trailing edge of the wing structure and being open at both ends; blower means located in the region of the trailing edge of said main portion for producing a forwardly directed stream of air through said duct means whereby air is discharged from the leading open end of said duct means; and means in the region of the leading edge of said wing structure for causing a downwardly directed outflow from said duct means whereby a nose-up moment is produced.

11. In an aircraft, in combination, a wing structure including a lower main portion, and a cover plate having a shape and area matching the top surface of the main portion and being mounted on the same for movement between a first position directly superimposed on said top surface of said main portion and forming an air foil with the same, and a second position spaced from said top surface and forming with the same a duct means extending from the leading edge to the trailing edge of the wing structure and being open at both ends; a leading and a trailing cross-flow blower means having parallel axes extending substantially in the direction of the elongation of the wing structure and mounted on the same in the region of the trailing edge of the same, each blower means having a discharge means, said blower means having a first position in which said discharge means point rearwardly for discharging air in rearward direction, and a second position in which the leading blower means discharges air into said duct means and in which the trailing blower means discharges air in downward direction in the region of the trailing edge of the wing structure whereby a nose-down movement is produced; and means in the region of the leading edge of said wing structure for causing a downwardly directed outflow of the air discharged by said leading blower means into said duct means whereby a nose-up moment compensating the nose-down moment is produced.

12. In an aircraft, in combination, a wing structure having a leading edge and a trailing edge, said wing structure comprising forward air guide means in the region of the leading edge of said wing structure and including a plurality of parts movable between a first position lying flat along the surface of the wing structure and a second position downwardly projecting from the wing structure and forming a first duct along said leading edge and forming outlet means for causing a downwardly directed outflow from said first duct, said forward air guide means further comprising a leading part adjacent said outlet means for downwardly guiding said outflow whereby a vortex is formed under said leading edge of said wing structure, and rear air guide means located in the region of said trailing edge and including a plurality of parts movable between a first position lying flat along the wing structure and a second position downwardly projecting from the wing structure and forming a second duct along said trailing edge and forming outlet means for discharging air from said second duct in the region of the top face of said wing structure in rearward and downward direction, said rear air guide means including a flap downwardly projecting in said second position and extending in said first position rearwardly from said wing structure along said trailing edge thereof, said flap having top and bottom surfaces continuing the top and bottom surfaces of said wing structure in rearward direction when said rear air guide means is in said first position; and means for producing streams of air in said ducts in said second positions of said forward and rear air guide means.

13. An arrangement as set forth in claim 12 wherein said leading part has top and bottom surfaces continuing in said first position of said forward air guide means the top and bottom surfaces of said wing structure in forward direction so that said leading part forms a new leading edge of said wing structure.

14. In an aircraft, in combination, a wing structure including a leading part, and a hollow trailing part having an air inlet in the upper wall thereof, another air inlet in the region of the rear edge of said trailing hollow part, and an opening in the lower wall thereof forwardly of said other air inlet and rearwardly of the first-mentioned air inlet; a valve member mounted on said trailing part movable between a position closing said other air inlet and a position opening the same; a closure flap mounted for movement between a position closing said air inlet in said upper wall and a position opening the same; and blower means located in said opening forwardly of the transverse axis of the aircraft and of the wing structure and being movable between a first position for discharging air from said opening in rearward direction, while sucking air through said air inlet in said upper wall while said valve member closes said other air inlet, and a second position for downwardly discharging air from said opening while said valve member opens said other air inlet and said closure flap closes said air inlet in said upper wall whereby air is sucked from the rear edge of said wing structure and discharged forwardly of said axis so that an air vortex is created underneath said hollow trailing part of said wing resulting in an effective wing profile suitable for low speed flights.

15. A wing structure as set forth in claim 14 and including a guide flap mounted on the leading edge of said leading part for movement between a position lying flat on said leading part, and a downwardly and forwardly projecting position aiding in the formation of said vortex.

16. In an aircraft, in combination, a fuselage; a wing structure having a leading edge and a trailing edge, and including ducts long the leading and trailing edges thereof having outlets for discharging air in downward direction; gas turbine means mounted on said fuselage and having a bypass passage and discharge outlet means; and means for selectively connecting said bypass passage either with said discharge outlet means or with said ducts for producing streams of air in the latter.

17. In an aircraft, in combination, a fuselage; a wing structure having a leading edge and a trailing edge, and including ducts long the leading and trailing edges thereof having outlets for discharging air in downward direction; gas turbine means mounted on said fuselage and having a bypass passage having a discharge outlet; duct means connecting said bypass passage with said ducts; and means for selectively connecting said bypass passage with said duct means and for closing the discharge outlet of said bypass passage, or for opening said discharge outlet, and for disconnecting said duct means from said bypass passage.

18. In an aircraft, in combination, a fuselage; a wing structure having a leading edge and a trailing edge, and including ducts long the leading and trailing edges thereof having outlets for discharging air in downward direction; gas turbine means on said fuselage having a bypass passage with a discharge outlet; duct means connected with said ducts and being curved; and diffuser means movable between a position connecting said discharge outlet with said duct means and a position permitting free discharge from said discharge outlet.

19. In an aircraft, in combination, a fuselage having a duct opening in the nose portion thereof in downward direction; a wing structure having a leading edge and a trailing edge, and including a duct along the trailing edge of the wing structure and having outlets for discharging air in downward direction; gas turbine means on said fuselage having a bypass passage with a discharge outlet; duct means connected with said ducts and being curved; and diffuser means movable between a position connecting said discharge outlet with said duct means and a position permitting free discharge from said discharge outlet.

20. An aircraft as set forth in claim 7 and including a fuselage; duct means in said fuselage and having air inlets and air outlets; combustion motor means located in said duct means and connected with said crossflow blower means for driving the same; and blower means for moving air through said duct means whereby the air is heated by said combustion motor means; and wherein said flap means is formed with a passage extending along said leading edge and communicating with said air outlet whereby said flap is heated and de-iced.

21. An aircraft as set forth in claim 20 wherein said fuselage has a thicker forward portion and a thinner tail portion; and wherein said air inlet is located at the rear surface of said thicker portion.

22. In an aircraft, in combination, a wing structure having a leading edge and a trailing edge, said wing structure comprising forward air guide means in the region of the leading edge of said wing structure and including a plurality of parts movable between a first position lying flat along the surface of the wing structure and a second position downwardly projecting from the wing structure and forming a first duct along said leading edge and forming outlet means for causing a downwardly directed outflow from said first duct, and rear air guide means located in the region of said trailing edge and including a plurality of parts movable between a first position lying flat along the wing structure and a second position downwardly projecting from the wing structure and forming a second duct along said trailing edge and forming outlet means for discharging air from said second duct in the region of the top face of said wing structure in rearward and downward direction, said parts of said forward and rear air guide means forming first and second ducts of trapezoidal cross-section; and means for producing streams of air in said ducts in said second positions of said forward and rear air guide means.

23. In an aircraft, in combination, a fuselage having a duct opening in the nose portion thereof in downward direction; a wing structure having a leading edge and a trailing edge, and including a duct along the trailing edge of said wing structure having outlets for discharging air in downward direction; duct means connected to said ducts and leading to the rear portion of the aircraft; gas turbine means arranged at said rear portion and provided with a discharge outlet; and connecting means movable between a position in which said connecting means connects at least a portion of said discharge outlet with said duct means for discharge thereinto, and another position in which said connecting means permits free discharge from said discharge outlet.

References Cited by the Examiner
UNITED STATES PATENTS

| | | | |
|---|---|---|---|
| 1,782,210 | 11/1930 | Nose | 244—42 |
| 2,172,370 | 9/1939 | Fahrney | 244—42 |
| 2,945,641 | 7/1960 | Prebram | 244—12 |
| 2,990,138 | 6/1961 | Shaw | 244—42 |
| 3,029,044 | 4/1962 | Childress | 244—12 |
| 3,082,976 | 3/1963 | Dornier | 244—12 |
| 3,114,519 | 12/1963 | Carter | 244—12 |
| 3,124,322 | 3/1964 | Cockerell | 244—42 |
| 3,149,805 | 9/1964 | Frey et al. | 244—42 |

MILTON BUCHLER, *Primary Examiner.*

B. BELKIN, *Assistant Examiner.*